United States Patent
Wakid

(10) Patent No.: US 10,659,125 B2
(45) Date of Patent: *May 19, 2020

(54) SYSTEM AND METHOD FOR ANTENNA ARRAY CONTROL AND COVERAGE MAPPING

(71) Applicant: Verizon Patent and Licensing Inc., Arlington, VA (US)

(72) Inventor: Shukri A. Wakid, North Potomac, MD (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/422,378

(22) Filed: May 24, 2019

(65) Prior Publication Data

US 2019/0288759 A1 Sep. 19, 2019

Related U.S. Application Data

(63) Continuation of application No. 15/913,482, filed on Mar. 6, 2018, now Pat. No. 10,340,996.

(51) Int. Cl.
*H04L 5/00* (2006.01)
*H04B 7/06* (2006.01)
(Continued)

(52) U.S. Cl.
CPC .......... *H04B 7/0617* (2013.01); *H04B 7/043* (2013.01); *H04B 7/0639* (2013.01); *H04B 3/52* (2013.01); *H04L 5/0053* (2013.01); *H04W 16/28* (2013.01)

(58) Field of Classification Search
USPC .......................................... 375/295; 342/451
See application file for complete search history.

(56) References Cited

U.S. PATENT DOCUMENTS 10,340,996 B1 * 7/2019 Wakid ................. H04B 7/0639
2008/0167049 A1 7/2008 Karr et al.
(Continued)

OTHER PUBLICATIONS

Bjornson, et al., "Optimal Multiuser Transmit Beamforming: A Difficult Problem with a Simple Solution Structure", [Lecture Notes]. IEEE Signal Processing Magazine, Institute of Electrical and Electronics Engineers, 2014, 31 (4), pp. 142-148.
(Continued)

*Primary Examiner* — Eva Y Puente

(57) ABSTRACT

A computer device may be configured to execute the instructions to identify a location for a user equipment (UE) device serviced by a base station slice associated with a base station; access a beam forming database (DB) to determine whether a match exists in the beam forming DB for the identified location; and determine that no match exists in the beam forming DB for the identified location. The computer device may be further configured to perform two-dimensional modeling of radio frequency signal propagation for the identified location using a terrain model, based on determining that no match exists in the beam forming DB for the identified location; determine antenna settings for an antenna array associated with the base station slice based on the performed two-dimensional modeling; and instruct the base station to apply the determined antenna settings to the antenna array.

20 Claims, 12 Drawing Sheets

(51) Int. Cl.
    *H04B 7/0426*     (2017.01)
    *H04W 16/28*     (2009.01)
    *H04B 3/52*     (2006.01)

(56) References Cited

U.S. PATENT DOCUMENTS

| | | |
|---|---|---|
| 2011/0267222 A1 | 11/2011 | Craig |
| 2011/0309983 A1 | 12/2011 | Holzer et al. |
| 2012/0281783 A1* | 11/2012 | Cheng ............... H04B 7/0456 375/295 |
| 2017/0250745 A1 | 8/2017 | Athley et al. |
| 2017/0303143 A1 | 10/2017 | Hyslop et al. |
| 2018/0081889 A1* | 3/2018 | Chen ................... G06F 3/0608 |
| 2018/0145807 A1 | 5/2018 | Nagata et al. |

OTHER PUBLICATIONS

Ryan, "Users' Guide for the VTRPE Computer Model", Naval Ocean Systems Center, San Diego, CA 92152, Oct. 1991.

\* cited by examiner

SYSTEM AND METHOD FOR ANTENNA ARRAY CONTROL AND COVERAGE MAPPING

CROSS REFERENCE TO RELATED APPLICATIONS

This patent application is a continuation of U.S. patent application Ser. No. 15/913,482, filed on Mar. 6, 2018, the contents of which are hereby incorporated herein by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices. In order to maintain a quality of service across a network, or across multiple networks, the provider may need to take into account various conditions that vary across the networks and/or devices.

DETAILED DESCRIPTION OF PREFERRED EMBODIMENTS

Figure 1:
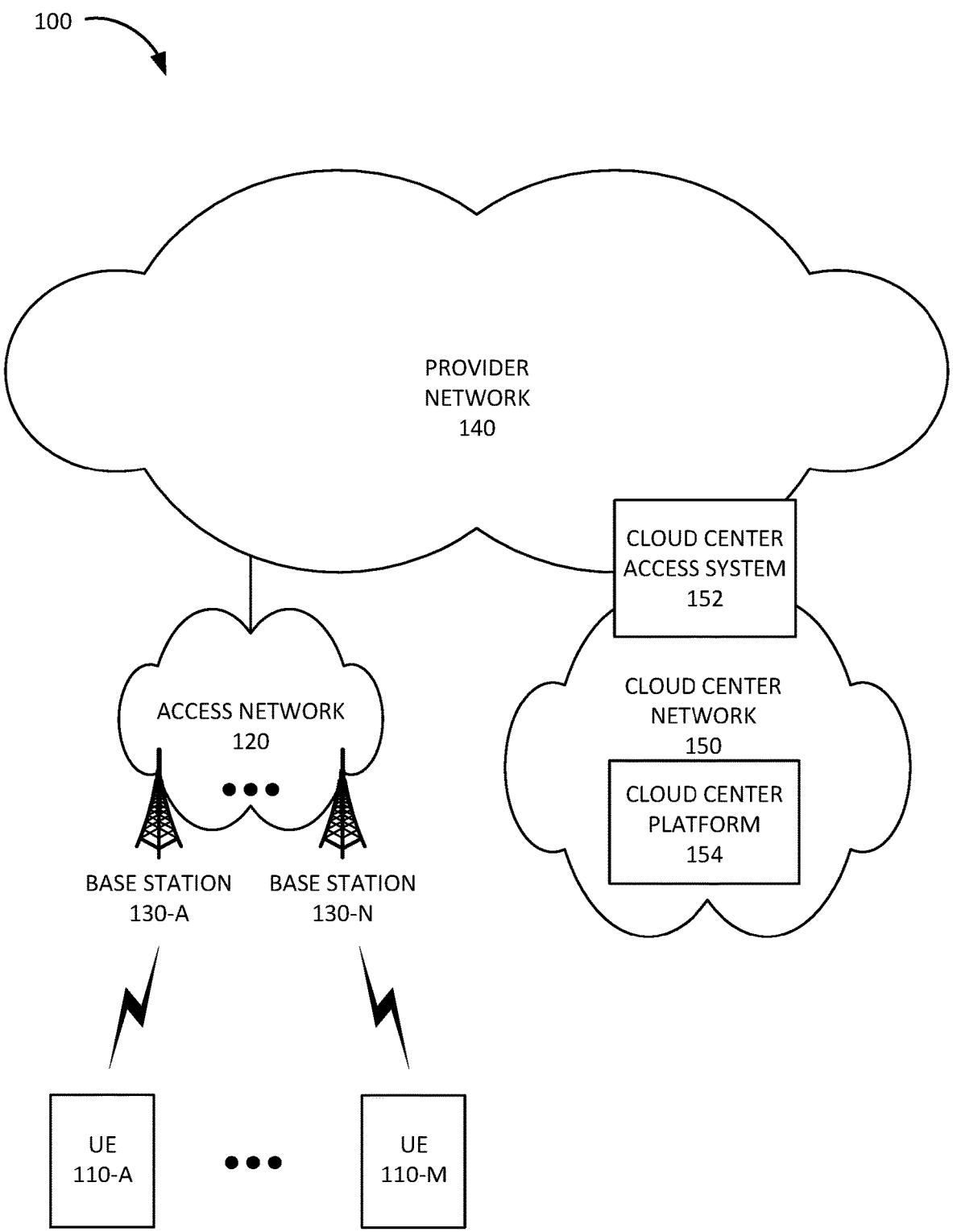
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks may become increasingly more complicated. One way in which wireless access networks are continuing to become more complicated is by incorporating various aspects of next generation networks like $5^{th}$ generation (5G) mobile networks, such as high frequency bands and a large number of antennas. 5G mm-wave technology may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

The antenna arrays may point to multiple users simultaneously using spatial multiplexing and/or beam forming. The use of mm-wave bands and large antenna arrays may require better directional resolution for accurate beam forming. For example, while phased arrays may include a number of predefined antenna array settings that may be selected to perform beam forming, current settings may not be adequate for 5G beam forming. Thus, adaptive antenna arrays that can be adjusted in real time to any available setting (e.g., each antenna element may be individually set to point in a particular direction) may be used. However, determining an optimal antenna array setting may pose significant challenges.

An optimum antenna array setting for a particular UE device may form an antenna beam toward the location of the particular UE device in such a way that the particular UE device receives signals at the maximum available signal power and/or quality, while minimizing interference to other UE devices serviced by a base station slice associated with an antenna array wireless transceiver. Thus, if the base station slice services k UE devices, the antenna array may form k simultaneous antenna beams. Beam forming of such k simultaneous antenna beams may be easier in line of sight (LOS) scenarios, in which each antenna beam may be formed to point directly toward the location of a particular UE device.

However, most wireless communication scenarios do not involve only LOS, as UE devices may be located further away than a LOS distance and wireless signals from a base station antenna array may encounter multipath wave propagation and fading as a result of scattering from terrain objects, such as buildings, foliage, mountains, vehicles, etc.; reflection from bodies of water; ionospheric reflection and/or refraction; atmospheric attenuation and scattering; and/or other types of signal interference. Therefore, in order to perform accurate beam forming, the base station may need to determine the location of the UE device, determine the terrain between the base station and the UE device, and determine how radio frequency (RF) signals in a particular band propagate to the determined location through the terrain. While such RF signal propagation may be modeled using stochastic models, such stochastic models may not be sufficiently accurate. Rather, RF signal propagation through a particular terrain may need to be modeled using ray tracing.

Even though ray tracing may accurately model RF signal propagation to a location through a terrain, ray tracing using a terrain model may be computationally demanding and take too long to perform for real-time beam forming. For example, real time 5G services may be required to deal with challenging use cases, such as when a UE device is moving at various speeds (e.g., with pedestrians, in personal vehicles, in unmanned aerial vehicles (e.g., drones, etc.), connected mass transit vehicles, etc.), different types of connections (e.g.,, mobile video streaming, mobile cloud services, remote machine control, real-time virtual and/or augmented reality applications, critical first responder, law enforcement, and/or remote health monitoring services, etc.), changing terrain conditions (e.g., changes in weather, foliage, density of people and/or vehicles, etc.), and/or other types of changing conditions. Thus, real-time beam forming may require simpler models and/or pre-computed values to determine antenna array settings for UE device locations in a particular terrain.

Implementations described herein relate to an orchestration engine, for 5G services, that determines antenna array settings for a base station slice. The orchestration engine may orchestrate (e.g., autonomously coordinate and/or manage) beam forming via an antenna array manager that controls an antenna array associated with a base station slice. A base station "slice," also referred to as a base station sector, refers to a sector of the area serviced by the base station. For example, the area serviced by the base station may be divided into three 120° slices or sectors, or a different number of circle sectors defining an area serviced by the base station. Each base station slice may be serviced by a wireless transceiver with an antenna array directed toward the area of the slice.

The orchestration engine, implemented on a computing platform that includes one or more computer devices, may determine real-time antenna array settings for an antenna array for a UE device based on the location of the UE device. If the signal quality associated with the real-time antenna settings does not satisfy a signal quality requirement, the orchestration engine may determine more accurate antenna array settings for the location by performing modeling using ray tracing of RF signals and a terrain model.

The orchestration engine may identify a location for a UE device serviced by the base station slice, access a beam forming database (DB) to determine whether a match exists in the beam forming DB for the identified location, and determine whether a match exists in the beam forming DB for the identified location. The beam forming DB may include lookup tables that include antenna array settings for locations that have been previously modeled. If there is a match, the orchestration engine may retrieve antenna array settings for the identified location and instruct the base station associated with the base station slice to apply the retrieved antenna array settings to the antenna array. If there is no match, the orchestration engine may perform two-dimensional (2D) modeling of RF signal propagation for the identified location using a terrain model, determine antenna array settings based on the 2D modeling, and instruct the base station associated with the base station slice to apply the determined antenna array settings to the antenna array. The 2D modeling may be performed using a parabolic wave equation model using the two parameters of altitude and range and a simple terrain model (e.g., a model that takes into account factors such as scattering and diffraction of the earth's surface, refraction in the atmosphere, and/or other factors that may be largely independent of azimuth). 2D modeling using a parabolic wave equation and a processing unit may be performed fast enough to be used in real-time or near real-time. The parabolic wave equation is a forward-scatter approximation to the full Helmholtz wave equation that includes effects caused by the diffraction of the ground surface, atmospheric refraction, and/or surface reflections. In other implementations, a different type of equation model may be used, such as another type of approximation to a full Helmholtz wave equation (e.g., a paraxial approximation).

The orchestration engine, and/or other components of the base station, may monitor quality of signals received by the UE device after the determined antenna array settings are applied. If the orchestration engine determines that the signal quality is below a signal quality threshold, the orchestration engine may determine that the antenna array settings obtained via the 2D modeling and/or lookup table values were not sufficiently accurate. In response, the orchestration engine may perform three-dimensional (3D) modeling of RF signal propagation for the identified location using a terrain model, determine updated antenna array settings for the antenna array based on the 3D modeling, and may update the lookup tables with the updated antenna array settings for the identified location.

The 3D modeling may include tracing RF signals from a transmission location, corresponding to the location of the antenna array, to a receiving location, corresponding to the identified location of the UE device, in an antenna beam direction based on a set of antenna array settings, using the terrain model, and computing, at the receiving location, one or more signal values for the RF signal based on the propagation of the RF signal through the terrain model. The one or more signal values may include, for example, a signal reflection value, a signal refraction value, a signal interference value, a power loss value, a data throughput value, a signal to noise ratio value, and/or an error rate value. The ray tracing may be performed from the transmission location to the receiving location for different antenna beam directions based on different antenna array settings and the best antenna beam direction may be selected based on the signal values determined for the different antenna beam directions. For example, the orchestration engine may select the antenna beam direction associated with the lowest power loss, the highest signal to noise ratio, and/or based on another signal value and/or combination of signal values.

The 3D modeling may determine a beam forming channel direction as a weighted average of a maximum ratio transmission (MRT) channel direction and a Zero Forcing (ZF) channel direction. The ZF channel direction may be based on priorities assigned to other UE devices serviced by the base station slice.

Different terrain models may be selected based on different conditions. For example, a particular terrain model may be selected based on the building type associated with the identified location, the day or a month of the year, the time of the day, the weather condition associated with the identified location, the traffic conditions associated with the identified location, a calendar event associated with the identified location, and/or any other type of condition associated with the terrain and the location.

In some implementations, the orchestration engine may monitor the signal quality for the UE device after updating the antenna array settings based on the results of the 3D modeling. If the orchestration engine determines that the updated signal quality is still below a signal quality threshold, the orchestration engine may determine that the terrain model is not sufficiently accurate. In response, the orchestration engine may generate an alert or report. The alert may trigger a response to obtain updated measurements (e.g. manually by a technician, or by placed sensors, etc.) to update the terrain model.

Furthermore, the orchestration engine may monitor the location of the UE device to determine whether the UE device is moving or stationary. If the UE device is moving, the orchestration engine may determine an expected location of the UE device at a particular time in the future, based on the speed and direction of the UE device and based on the terrain model. The orchestration engine may then determine the antenna array settings in advance for the expected location based on the lookup tables and/or by performing 2D modeling for the expected location. If the orchestration engine determines that the expected location of the UE device is associated with another antenna array, the orchestration engine may provide information associated with the expected location of the UE device to an orchestration engine associated with the other antenna array.

In some implementations, the orchestration engine may be implemented using one or more virtual machines (VMs). A first VM may implement the functions of identifying the location for the UE device, orchestrating beam forming by instructing the base station to apply the determined antenna array settings to the antenna array, and/or controlling the other VMs. A second VM may implement the 2D modeling and the lookup tables and a third VM may manage the terrain models and the 3D modeling. Using separate VMs for controlling the antenna array, implementing the 2D modeling, and implementing the 3D modeling may enable modularization of the modeling functions. Thus, the 2D and/or 3D models may be updated without having to take the antenna array manager offline, resulting in more efficient use of resources. Furthermore, the modularized VMs may be more efficiently implemented and/or distributed across computer devices in a computing platform of a cloud computing center.

Using an orchestration engine to determine settings for an antenna array for optimal beam forming improves the operation of a wireless access network by improving signal quality for UE devices. Furthermore, improving the signal quality for UE devices conserves the resources of the wireless access network, such as transmit power and bandwidth, by enabling more efficient delivery of wireless signals to UE devices serviced by a base station. Using 2D modeling in real-time, or near real-time, enables the wireless access network to achieve optimal beam forming at a faster rate. Furthermore, using 3D modeling and a terrain model enables the wireless access network to further improve signal quality by providing more accurate beam forming information for an antenna array.

FIG. 1 is a diagram of an exemplary environment 100 in which systems and/or methods, described herein, may be implemented. As shown in FIG. 1, environment 100 may include UE devices 110-A to 110-M, access network 120, provider network 140, and cloud center network 150.

UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, mobile broadband services (e.g., video streaming, real-time gaming, high speed Internet access etc.), best effort data traffic, and/or other types of applications.

In other implementations, UE device 110 may include an Internet of Things (IoT) computer device enabled with wireless communication functionality and employing machine-to-machine (M2M) communication. In some implementations, the M2M communication may include Machine-Type Communication (MTC). In other implementations, the M2M communication may include a different type of communication. For example, UE device 110 may include an embedded wireless MTC device that communicates wirelessly with other devices over an M2M interface, such as a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In yet other implementations, UE device 110 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones or aerial devices.

Access network 120 may enable UE devices 110 to connect to provider network 140 for mobile telephone service, Short Message Service (SMS) message service, Multimedia Message Service (MMS) message service, Internet access, access to a private network, cloud computing, and/or other types of data services. Access network 120 may establish a packet data network connection between UE device 110 and provider network 140. In some implementations, access network 120 may include an LTE wireless access network (e.g., an evolved packet core (EPC) network). In other implementations, wireless access network 120 may include a Code Division Multiple Access (CDMA) wireless access network. For example, the CDMA wireless access network may include a CDMA enhanced High Rate Packet Data (eHRPD) network (which may provide access to an LTE wireless access network).

Access network 120 may include an LTE Advanced (LTE-A) wireless access network and/or any other advanced network, such as a 5G wireless access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Access network 120 may include one or more access network devices that facilitate access to provider network 140, such as, for example, an MME node, an SGW node, a PGW node, an HSS node, a Policy Charging and Rules Function (PCRF) node, an Authentication, Authorization, and Accounting (AAA) node, a Multimedia Broadcast Multicast Service (MBMS) node, a Machine Type Communication (MTC) Interworking Function (IWF) node, a Service Capability Server (SCS) node, an evolved Packet Data Gateway (ePDG) node, and/or another type of network node that may be included in a wireless access network.

Access network 120 may include base stations 130-A to 130-N. Base station 130 may include an eNodeB and/or gNodeB base station device may use the Evolved Universal Terrestrial Radio Access (E-UTRA) air interface to wirelessly communicate with devices. Base station 130 may include one or more devices (e.g., wireless transceivers) and other components and functionality that allow UE device 110 to wirelessly connect to access network 120. Base station 130 may correspond to a macrocell or to a small cell (e.g., a femtocell, a picocell, a microcell, etc.). Base station 130 may include or be associated with one or more slices (also referred to as "sectors" or "cells"). For example, each slice may include a radio frequency (RF) transceiver facing a particular direction. Each slice of base station 130 may include a MIMO antenna array configured to operate in an mm-wave band, such as AWS, PCS, and/or another high frequency LTE band.

Provider network 140 may correspond to a network managed by a provider of communication services. Provider network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. In some implementations, provider network 140 may include an Internet Protocol Multimedia Sub-system (IMS) network (not shown in FIG. 1). An IMS network may include a network for delivering IP multimedia services and may provide media flows between user devices and external IP networks or external circuit-switched networks (not shown in FIG. 1). Provider network 140 may connect to, and may enable communication with access network 120 and/or cloud center network 150.

Cloud center network 150 may include a Layer 2 and/or Layer 3 network managed by provider network 140. Cloud center network 150 may include a cloud center access system 152 and a cloud center platform 154. Cloud center access system 152 may include one or more devices that connect cloud center network 150 to provider network 140 via a Layer 2 connection or with a Layer 3 connection. For example, cloud center access system 152 may include one or more network devices that function as Layer 2 and/or Layer 3 devices and that maintain Layer 2 and/or Layer 3 separation for different customers and/or different services. Cloud center platform 154 may include one or more computer devices (e.g., a server farm, server cluster, etc.) that provide cloud computing services for provider network 140 and/or access network 120. In particular, cloud center platform 154 may perform some or all of the functionality of an orchestration engine for controlling antenna array settings for base station 130.

Although FIG. 1 shows exemplary components of environment 100, in other implementations, environment 100 may include fewer components, different components, differently arranged components, or additional functional components than those depicted in FIG. 1. Additionally or alternatively, one or more components of environment 100 may perform functions described as being performed by one or more other components of environment 100. For example, although environment 100 includes a single access network 120 and a single cloud center network 150 for illustrative purposes, in practice, environment 100 may include multiple access networks 120 and/or multiple cloud center networks 150.

Figure 2A:
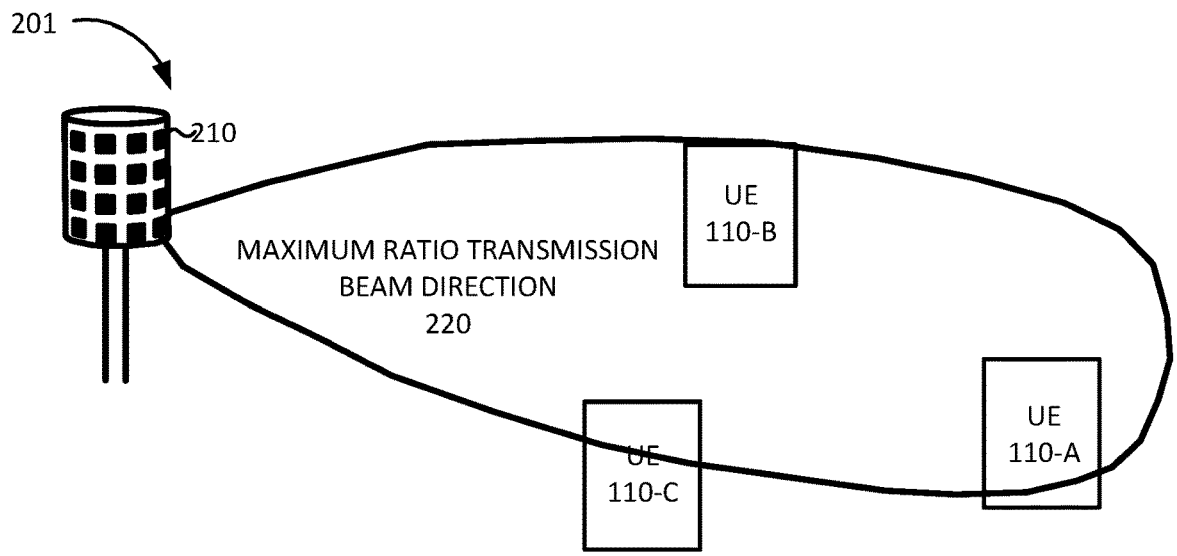
FIGS. 2A-2C are diagrams illustrating exemplary beam directions associated with an antenna array according to an implementation described herein.

FIG. 2A is a diagram 201 illustrating a first exemplary beam direction associated with base station 130. Diagram 201 includes an antenna array 210 for a base station slice of base station 130. For example, base station 130 may include three base station slices, each covering about a 120° slice of the geographic area served by base station 130, and each base station slice may include a wireless transceiver that includes antenna array 210. Antenna array 210 may include an array of controllable antenna elements. The antenna elements may be digitally controllable to electronically tilt an antenna beam in a vertical direction and/or horizontal direction. In some implementations, the antenna elements may additionally be controllable via mechanical steering using one or more motors associated with each antenna element. The base station slice associated with antenna array 210 may serve k UE devices 110 and antenna array 210 may simultaneously generate k antenna beams.

Figure 2B:
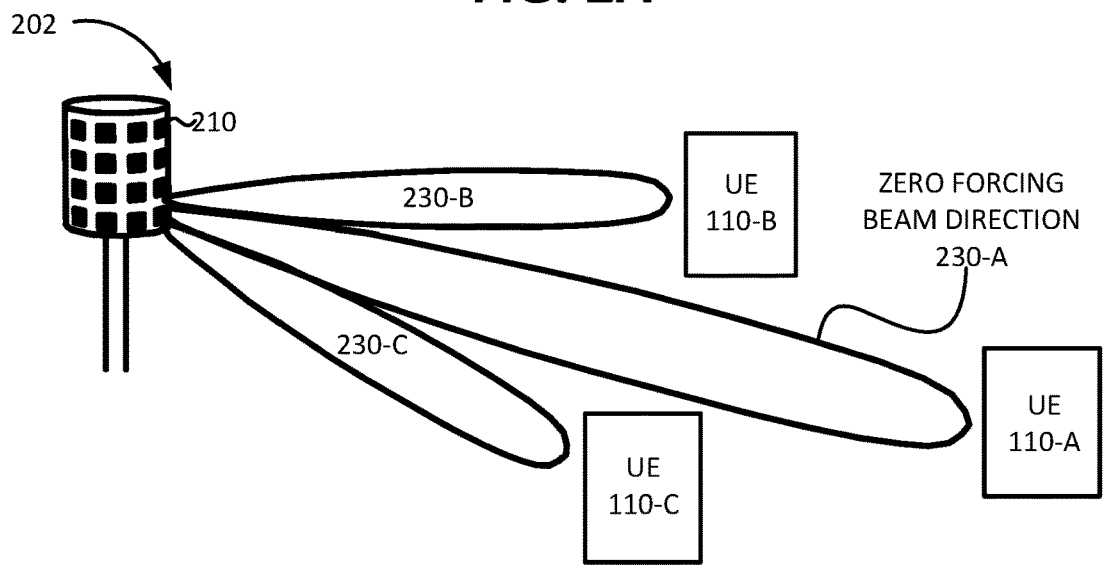

FIG. 2A illustrates a maximum ratio transmission (MRT) beam direction 220 associated with UE device 110-A. MRT beam direction 220 may maximize the received signal power at the intended recipient, namely UE device 110-A. However, MRT beam direction 220 may interfere with other UE devices 110, such as UE device 110-B and UE device 110-C. FIG. 2B is a diagram 202 illustrating a zero forcing (ZF) beam direction 230-A, also referred to as a zero inter-user interference beam direction. ZF beam direction 230-A minimizes interference with other UE devices 110, such as UE device 110-B and UE device 110-C. Similarly, a ZF beam direction 230-B to UE device 110-B may minimize interference to UE device 110-A and UE device 110-C and ZF beam direction 230-C to UE device 110-C may minimize interference to UE device 110-A and UE device 110-B. However, ZF beam direction 230-A may result in insufficient received power at UE device 110-A. Therefore, optimal beam forming may require a balance between MRT beam direction 220 and ZF beam direction 230-A.

Figure 2C:
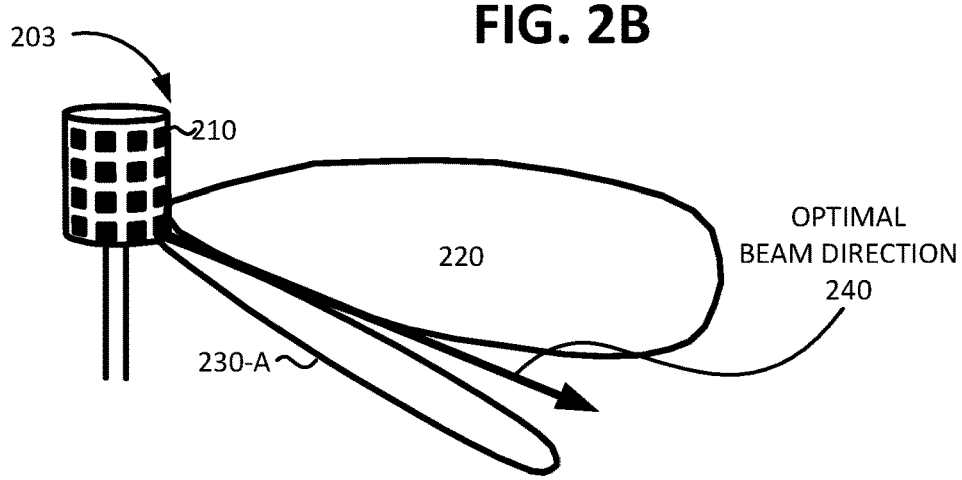

FIG. 2C is a diagram 203 illustrating an optimal beam direction 240. Optimal beam direction 240 may be positioned somewhere between MRT beam direction 220 and ZF beam direction 230-A. Thus, optimal beam direction 240 may balance maximizing received power at UE device 110-A with minimizing interference with other UE devices serviced by antenna array 210. Thus, optimal beam direction 240 may be expressed and calculated as a weighted average of MRT beam direction 220 and ZF beam direction 230-A. Different weights may be used to emphasize either MRT beam direction 220 or ZF beam direction 230-A. For example, if higher received power to UE device 110-A is more desirable, MRT beam direction 220 may be assigned a higher weight. Alternatively, if less interference is more desirable, ZF beam direction 230-A may be assigned a higher weight.

Furthermore, ZF beam direction 230-A may depend on the number of UE devices 110 serviced by antenna array 210 and may also depend on priorities assigned to other UE devices 110. For example, if, UE device 110-B is associated with a real-time voice or video bearer connection, UE device 110-B may be assigned a higher priority than UE device 110-C. Thus, ZF beam direction 230-A may point in a different direction (e.g., away from UE device 110-B and toward UE device 110-C). Therefore, optimal beam direction 240 may depend on the number of UE devices 110 serviced by antenna array 210 and/or the priorities assigned to the other UE device 110 serviced by antenna array 210.

Figure 3:
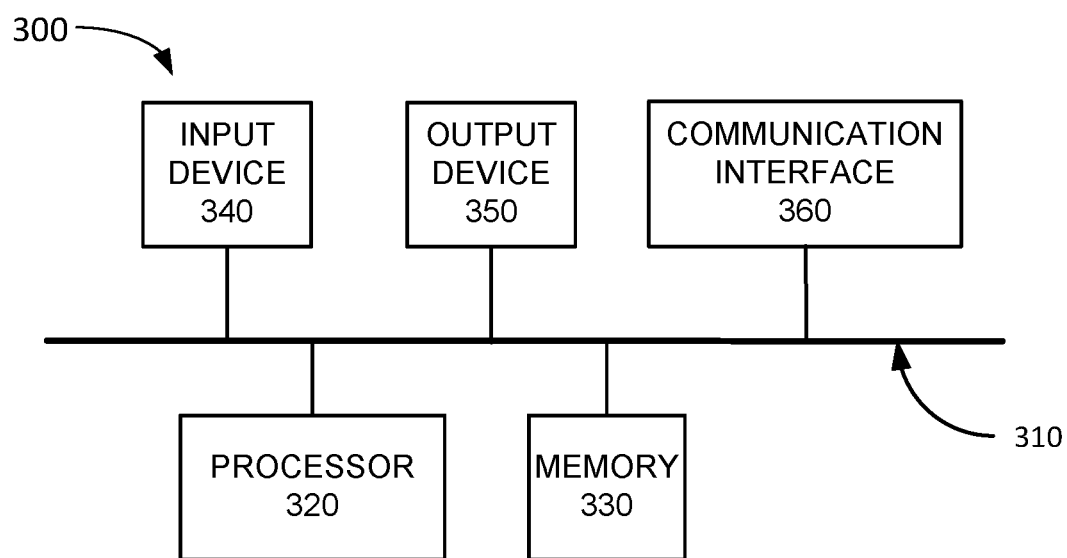
FIG. 3 is a diagram illustrating exemplary components of a device that may be included in a device or system of FIG. 1.

FIG. 3 is a diagram illustrating exemplary components of device 300 according to an implementation described herein. UE device 110, base station 130, cloud center access system 152, and/or cloud center platform 154 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. For example, processor 320 may include one or more Central Processing Units (CPUs) and/or one or more Graphics Processing Units (GPU). In other embodiments, processor 320 may include an application-specific integrated circuit (ASIC), a field-programmable gate array (FPGA), and/or another type of integrated circuit or processing logic. Processor 320 may control operation of device 300 and its components.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300 and/or to collect information from the environment using one or more sensors. Input device 340 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device. In some implementations, device 300 may be managed remotely and may not include input device 340. In other words, device 300 may be "headless" and may not include a keyboard, for example.

Output device 350 may output information to an operator of device 300 and/or to control device 300 and/or the environment using one or more actuators. Output device 350 may include a display, a printer, a speaker, an illumination source (e.g., a camera flash), an actuator to cause device 300 to vibrate, a motor to cause part of device 300 to move, a lock device, and/or another type of output device. For example, device 300 may include a display, which may include a liquid-crystal display (LCD), a light emitting diode (LED) display, an organic LED (OLED) display, an electrophoretic (e.g., electronic ink) display, and/or another type of display device for displaying content to a user. In some implementations, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals. For example, if device 300 is included in UE device 110 or base station 130, communication interface 360 may include an antenna assembly that includes one or more antennas to transmit and/or receive RF signals. For example, communication interface 360 may be coupled to antenna array 210.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 300 may perform certain operations relating to orchestration of antenna array settings. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
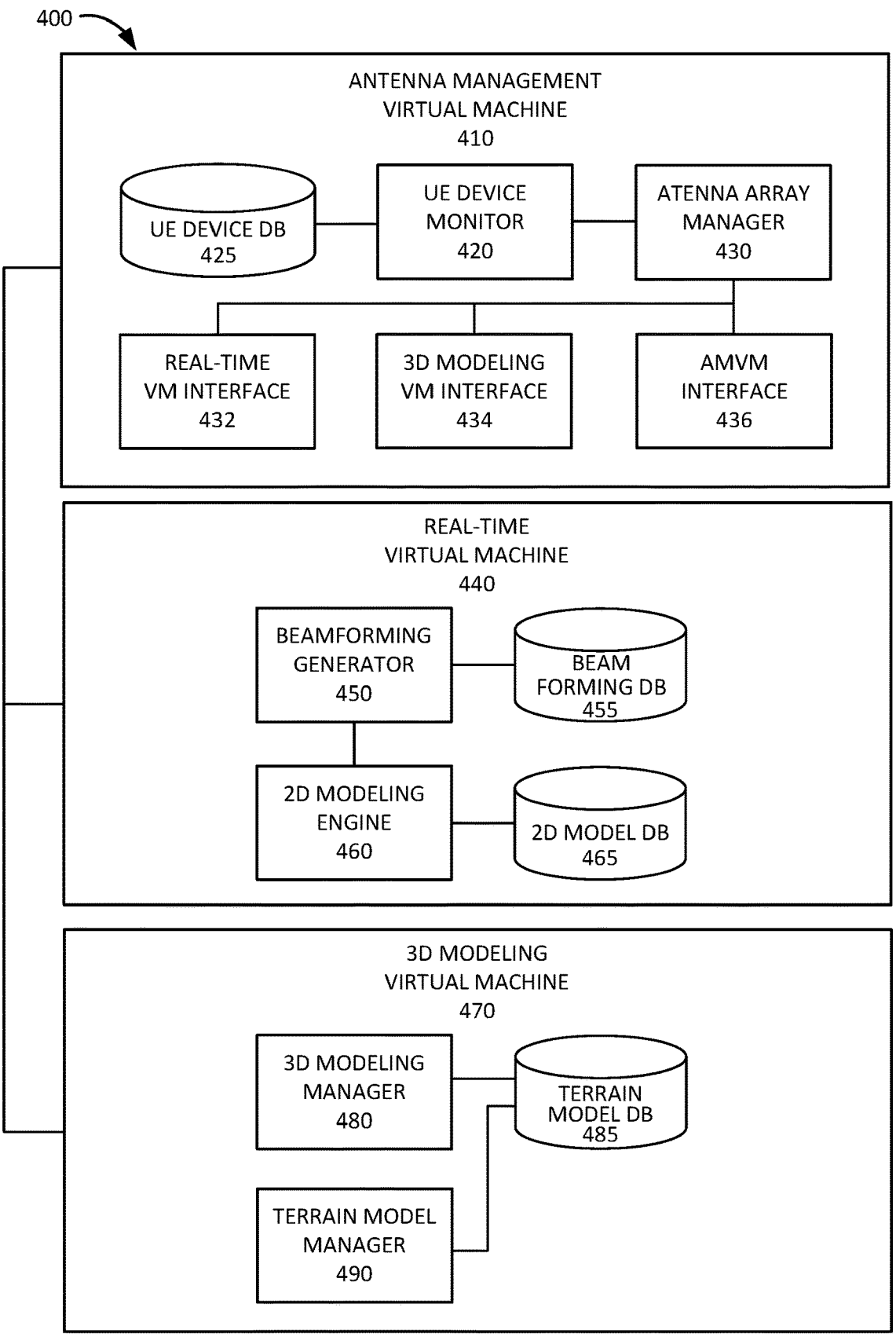
FIG. 4 is a diagram illustrating exemplary functional components of the base station of FIG. 1.

FIG. 4 is a diagram illustrating exemplary functional components of an orchestration engine 400. The functional components of orchestration engine 400 may be implemented, for example, via processor 320 executing instructions from memory 330. Alternatively, some or all of the functional components included in orchestration engine 400 may be implemented via hard-wired circuitry. In some implementations, orchestration engine 400 may be implemented by cloud center platform 154. In other implementations, some or all components of orchestration engine 400 may be implemented by base station 130.

As shown in FIG. 4, orchestration engine 400 may include an antenna management VM 410, a real-time VM 440, and a 3D modeling VM 470. Antenna management VM 410 may manage settings of antenna array 210 with respect to particular UE devices 110. Antenna management VM 410 may include a UE device monitor 420, a UE device DB 425, an antenna array manager 430, a real-time VM interface 432, a 3D modeling VM interface 434, and an antenna manager (AM) VM interface 436.

UE device monitor 420 may monitor UE devices 110 serviced by antenna array 210. For example, UE device monitor 420 may monitor the location of UE device 110. Furthermore, UE device monitor 420 may determine whether UE device 110 is moving. If UE device 110 is moving, UE device monitor 420 may determine the speed and direction of the movement of UE device 110 and may determine an expected location of UE device 110 based on the speed and direction of movement. In some implementations, UE device monitor 420 may obtain terrain information from 3D modeling VM 470 to identify a route along which UE device 110 is moving (e.g., a particular road, etc.) and may determine the expected location of UE device 110 based on the identified route.

Moreover, UE device monitor 420 may monitor the signal quality associated with UE device 110. For example, UE device monitor 420 may monitor one or more signal quality key performance indicators (KPIs) associated with UE device 110, such as, for example, a signal strength and/or power loss value (e.g., a Received Signal Strength Indicator (RSSI) value, a Reference Signal Received Power (RSRP) value, etc.), a signal quality value (e.g., a Reference Signal Received Quality (RSRQ), etc.), a signal to noise ratio (SNR) and/or signal to interference plus noise ratio (SINR) value, and/or another type of signal quality value. If the signal quality value is below a signal quality threshold, UE device monitor 420 may determine that a setting of antenna array 210 is not sufficiently accurate for the location associated with UE device 110 and may initiate 3D modeling, via 3D modeling VM interface 434, to determine a more accurate setting for antenna array 210.

Furthermore, UE device monitor 420 may monitor the distribution of UE devices 110 serviced by antenna array 210, such as, for example, the number of UE devices 110 serviced by antenna array 210 and the priorities associated with UE devices 110 serviced by antenna array 210. If the number of UE devices 110 serviced by antenna array 210 changes, or if the priorities associated with UE devices 110 serviced by antenna array 210 change, UE device monitor 420 may update the settings for antenna array 210 via real-time VM interface 432.

UE device DB 425 may store information relating to UE devices 110 serviced by antenna array 210. For example, UE device DB 425 may store information identifying a particular UE device 110, such as a Mobile Station International Subscriber Directory Number (MSISDN), an International Mobile Subscriber Identity (IMSI) number, a Mobile Directory Number (MDN), an International Mobile Equipment Identifier (IMEI), a Media Access Control (MAC) address, a Session Initiation Protocol (SIP) address, and/or another type of UE device ID. Furthermore, UE device DB 425 may store information identifying the location of the particular UE device 110, whether the particular UE device 110 is in motion, the speed and direction of the particular UE device 110, a priority assigned to the particular UE device, and/or other type of information associated with the particular UE device 110.

Antenna array manager 430 may manage antenna array 210. For example, antenna array manager 430 may configure antenna array 210 to transmit wireless signals via a beam that radiates in a particular direction based on information received from real-time VM 440 via real-time VM interface 432. Real-time VM interface 432 may be configured to communicate with real-time VM 440. For example, real-time VM interface 432 may request settings for antenna array 210 for a location associated with UE device 110 and a distribution of UE devices 110 and may receive real-time antenna settings from real-time VM 440. 3D modeling VM interface 434 may be configured to communicate with 3D modeling VM 470. For example, 3D modeling VM interface 434 may request that 3D modeling VM 470 perform 3D modeling of RF signal propagation to a particular location using a particular terrain model.

Antenna manager VM interface 436 may be configured to communicate with antenna manager VMs 410 associated with other base station slices (e.g., another base station slice associated with base station 130 or a base station slice associated with a neighboring base station 130). For example, when antenna manager VM 410 detects that UE device 110 is moving out of the service range of the base station slice, antenna manager VM 410 may provide, via antenna manager VM interface 436, information relating to location, speed, and/or direction of UE device 110 to antenna manager VM 410 associated with the other base station slice.

Real-time VM 440 may determine real-time adjustments for antenna array 210 for particular locations. Real-time VM 440 may include beam forming generator 450, beam forming DB 455, 2D modeling engine 460, and 2D model DB 465. Beam forming generator 450 may generate beam forming settings for antenna array 210 for a location of UE device 110. For example, beam forming generator 450 may access beam forming DB 455 to determine whether there is a match for the location of UE device 110. Exemplary information that may be stored in beam forming DB 455 is described below with reference to FIG. 5A. If there is no match, beam forming generator 450 may activate 2D modeling engine 460 to compute a beam direction for the location of UE device 110.

2D modeling engine 460 may perform 2D modeling of RF signal propagation using a parabolic wave equation model and a terrain model. The parabolic wave equation model may include, for example, a Radio Physical Optics (RPO) model, a Terrain Parabolic Equation Model (TPEM), Advanced Propagation Model (APM), Variable Terrain Radio Parabolic Equation (VTRPE) model, and/or another type of model. The terrain model may include scattering and diffraction parameters for the surface of the earth, parameters for atmosphere refraction, and/or other factors that may be independent of azimuth. Furthermore, the terrain model may include simple features of the terrain, such as mountains, an area of foliage, simple building shapes, etc. 2D modeling engine 460 may define a location of UE device 110 based on a range and altitude from antenna array 210 and may perform RF signal propagation modeling from the location of antenna array 210 to the location of UE device 110 using various beam directions to determine which beam direction results in the best signal quality received at the location of UE device 110. 2D modeling engine 460 may utilize one or more processors, CPUs, and/or GPUs to perform the RF signal propagation modeling. Using the processors (e.g., GPUs) may enable 2D modeling engine 460 to determine the best beam direction in real-time or near real-time. 2D modeling engine 460 may provide the results of the RF signal propagation modeling to beam forming generator 450 and beam forming generator 450 may provide the results to antenna management VM 410 and may also update beam forming DB 455. 2D model DB 465 may store one or more 2D models that may be used by 2D modeling engine 460 during the RF signal propagation modeling. 2D model DB 465 may include different models used for 2D modeling, such as, for example, models for different weather conditions.

3D modeling VM 470 may perform 3D modeling to determine adjustments for antenna array 210 for particular locations at which UE device 110 may be located. 3D modeling VM 470 may include 3D modeling manager 480, terrain model DB 485, and terrain model manager 490.

3D modeling manager 480 may perform 3D modeling of RF signal propagation using a terrain model. Different terrain models may be stored in terrain model DB 485 and 3D modeling manager 480 may select a particular terrain model based on conditions associated with the terrain in the area serviced by the base station slice associated with antenna array 210. 3D modeling manager 480 may define a location of UE device 110 with respect to antenna array 210 based on a range, altitude, and azimuth and may perform RF signal propagation modeling from the location of antenna array 210 to the location of UE device 110 through the terrain model using various beam directions to determine which beam direction results in the best signal quality received at the location of UE device 110.

Terrain model manager 490 may manage terrain models stored in terrain model DB 485. For example, terrain model manager 490 may select a particular terrain model based on terrain conditions associated with the area serviced by antenna array 210. Terrain model manager 490 may select a particular terrain model based on a day or month of the year, a time of the day, a weather condition, a traffic condition, a calendar event, and/or another type of condition associated with the terrain.

Furthermore, terrain model manager 490 may determine that a particular terrain model is not sufficiently accurate based on receiving information from antenna management VM 410 indicating that the signal quality of UE device 110 is below a signal quality threshold after generating a beam based on a beam direction obtained via 3D modeling using the particular terrain model. In response, terrain model manager 490 may update the particular terrain model. For example, terrain model manager 490 may generate an alert to dispatch a technician to the area serviced by the base station slice to obtain more accurate measurements of the terrain.

Although FIG. 4 shows exemplary components of orchestration engine 400, in other implementations, orchestration engine 400 may include fewer components, different components, additional components, or differently arranged components than those depicted in FIG. 4. Additionally or alternatively, one or more components of orchestration engine 400 may perform one or more tasks described as being performed by one or more other components of orchestration engine 400.

Figure 5A:
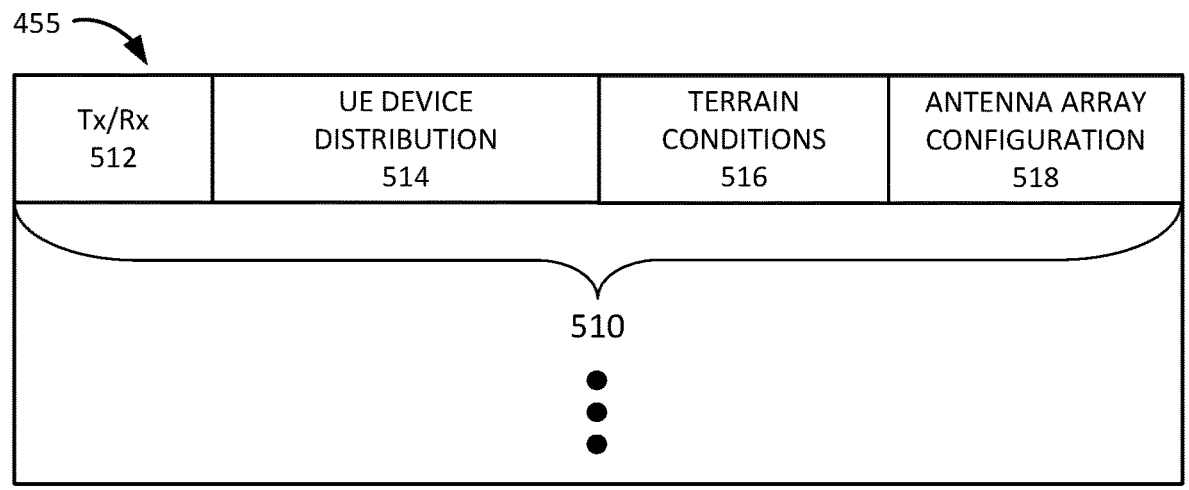
FIG. 5A is a diagram illustrating exemplary components of the beam forming database of FIG. 4.

FIG. 5A is a diagram illustrating exemplary components of beam forming DB 455. As shown in FIG. 5A, beam forming DB 455 may include one or more location entries 510. Each location entry 510 may store information relating to a particular location of UE device 110. Location entry 510 may include a transmission (Tx) and reception (Rx) location pair field 512, a UE device distribution field 514, a terrain conditions field 516, and an antenna array configuration field 518.

Tx/Rx location pair field 512 may identify a transmission location and a receiving location for an antenna beam. The transmission location may correspond to the location of antenna array 210 (and thus may not change) and the receiving location may correspond to a location in the area serviced by antenna array 210 at which UE device 110 is located.

UE device distribution field 514 may store information identifying a number of UE devices 110 being serviced by antenna array 210 and/or priorities assigned to UE devices 110 serviced by antenna array 210. Different numbers of UE devices and/or priority distributions may result in different ZF beam directions 230 and thus in different optimal beam directions 240. Therefore, beam forming DB 455 may include multiple entries for the same location (e.g., same Tx/Rx location pair) for different UE device distributions.

Terrain conditions field 516 may store information identifying a particular set of terrain conditions. The terrain conditions for the area serviced by antenna array 210 may change based on the time of the year. For example, the RF signal propagation characteristics of a terrain may change between the summer and winter based on the presence or absence of foliage. Furthermore, the terrain conditions for the area serviced by antenna array 210 may also change based on the time of the day. For example, the RF signal propagation characteristics of the terrain may change based on the density of vehicles and/or people present in the terrain and may change between rush hour and non-rush hour times of day, between business hours and non-business hours times of day, between day hours and night hours, and/or between different times of day. Moreover, the terrain conditions for the area serviced by antenna array 210 may also change based on the weather conditions, as the RF signal propagation characteristics of the terrain may differ based on whether or not there is precipitation, the amount of humidity in the air, the air temperature, and/or based on other types of weather characteristics. Therefore, beam forming DB 455 may include multiple entries for the same location (e.g., same Tx/Rx location pair) for different terrain conditions.

Antenna array configuration field 518 may store information identifying the settings for antenna array 210 for the location identified in Tx/Rx location pair field 512 for the UE device distribution identified in UE device distribution field 514 and the terrain conditions identified in terrain conditions field 516. For example, antenna array configuration field 518 may store information identifying a beam direction associated with the settings. Additionally or alternatively, antenna array configuration field 518 may store information identifying the electric beam tilt settings for the elements of antenna array 210.

Although FIG. 5A shows exemplary components of beam forming DB 455, in other implementations, beam forming DB 455 may include fewer components, different components, additional components, or differently arranged components than depicted in FIG. 5A.

Figure 5B:
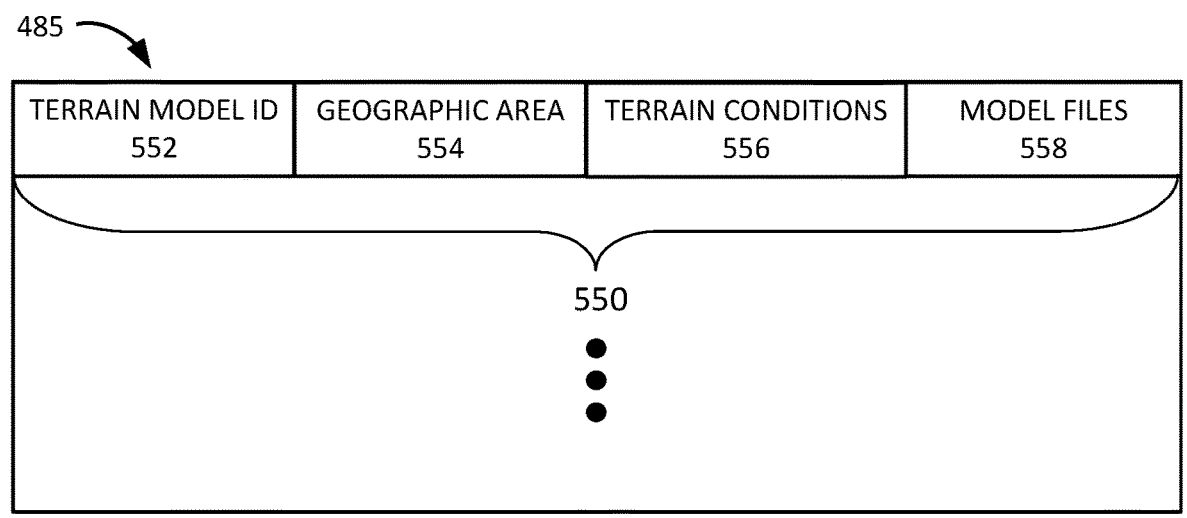
FIG. 5B is a diagram illustrating exemplary components of the terrain model database of FIG. 4.

FIG. 5B is a diagram illustrating exemplary components of terrain model DB 485. As shown in FIG. 5B, terrain model DB 485 may store one or more terrain model records 550. Each terrain model record 550 may store information relating to a particular terrain model. Terrain model record 550 may include a terrain model identifier (ID) field 552, a geographic area field 554, a terrain conditions field 556, and a model files field 558.

Terrain model ID field 552 may store an ID that uniquely identifies a particular terrain model. Geographic area field 554 may identify the geographic area associated with the particular terrain model. For example, geographic area field 554 may identify an area bounded by latitude and longitude coordinates, an area specified by one or more grid elements in a geographic grid, and/or may identify the geographic area using a different type of geographic information.

Terrain conditions field 556 may specify one or more terrain conditions associated with the particular terrain model, such as, for example, the time of year (e.g., one or more months of the year) and a measure of the extent of foliage that is present in the terrain model, a time of day (e.g., a particular range of times) and a measure of the extent of vehicular and/or pedestrian traffic present in the terrain model, a weather condition associated with the terrain model, a traffic condition associated with the terrain model, an event condition associated with the terrain model (e.g., a stadium event for a base station slice serving an area that includes a stadium, etc.), and/or other types of terrain conditions.

Model files field 558 may store information identifying one or more terrain model files. In some implementations, the terrain model files may be obtained from publicly available sources, such as government agencies, military databases, terrain modeling organizations, and/or other types of available sources. In other implementations, the terrain model files may be generated by performing measurements of the terrain (e.g., by sending out a technician to the terrain to perform the measurements). Furthermore, in some implementations, the terrain model files may include modular elements that may be added to the terrain based on information obtained for the terrain. The modular elements may include, for example, foliage modular elements (e.g., trees, etc.), building models based on models of particular building types (e.g., residential houses, office buildings, retail stores, etc.), vehicle modular elements, and/or other types of elements that may occur in multiple instances in the terrain.

Although FIG. 5B shows exemplary components of terrain model DB 485, in other implementations, terrain model DB 485 may include fewer components, different components, additional components, or differently arranged components than depicted in FIG. 5B.

While FIGS. 5A and 5B may be generated for a particular frequency band, other frequency bands may exhibit different RF propagation characteristics. Therefore, in some implementations, in which antenna array 210 is configured to transmit and/or receive signals in multiple frequency bands, orchestration engine 400 may include multiple beam forming DB 455 and/or multiple terrain model DBs 485 for different frequency bands.

Figure 6:
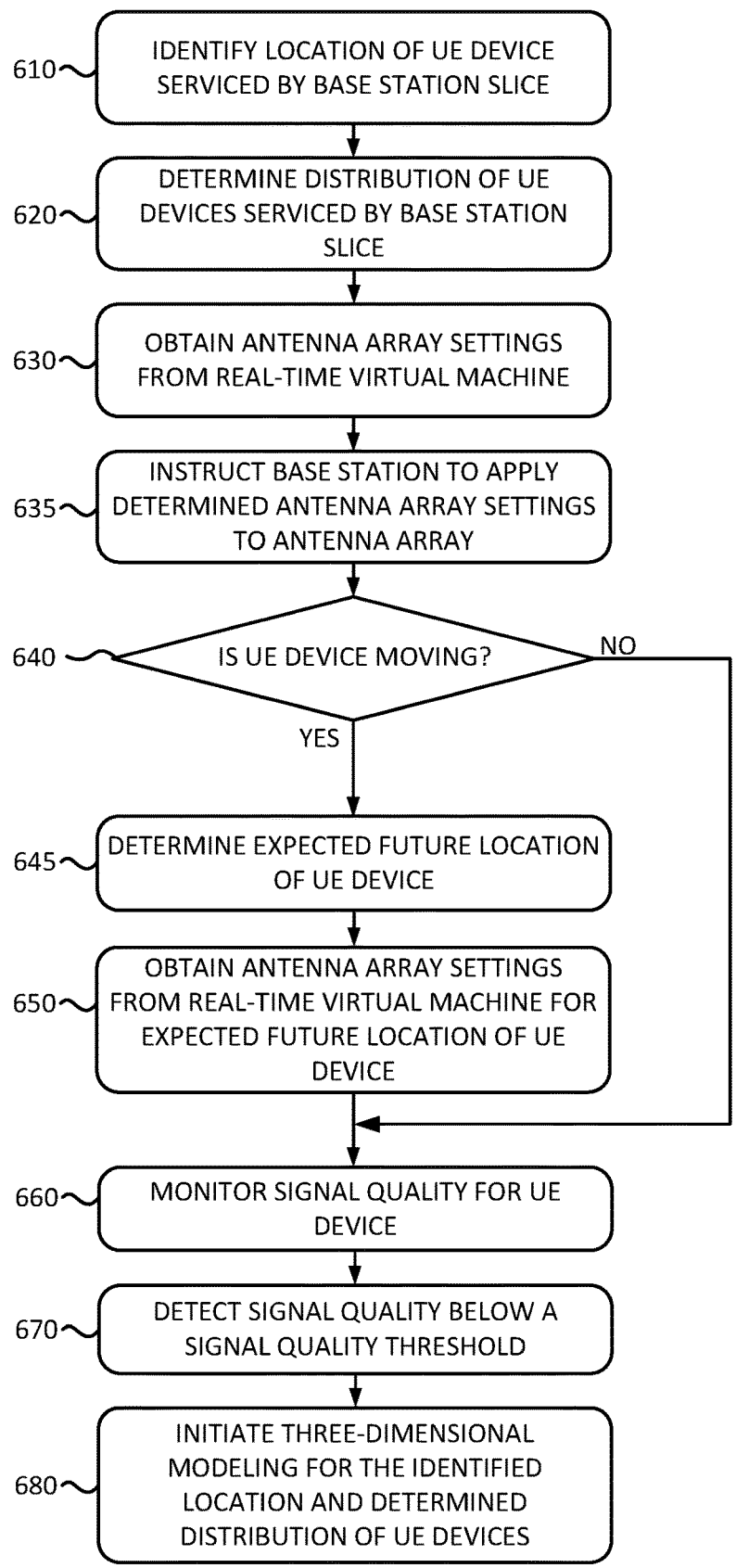
FIG. 6 is a flowchart of a process for managing antenna array settings according to an implementation described herein.

FIG. 6 is a flowchart of a process for managing antenna array settings according to an implementation described herein. In some implementations, the process of FIG. 6 may be performed by cloud center platform 154. In other implementations, some or all of the process of FIG. 6 may be performed by another device or a group of devices separate from the cloud center platform 154, such as base station 130.

The process of FIG. 6 may include identifying the location of UE device 110 serviced by a base station slice (block 610), determining a distribution of UE devices 110 serviced by the base station slice (block 620), and obtaining antenna array settings from a real-time VM 440 (block 630). For example, UE device monitor 420 may determine the location of UE device 110 by obtaining location information from UE device 110 and may determine the distribution of UE devices 110 by accessing UE device DB 425 to determine the number of UE devices 110 serviced by antenna array 210 and the priorities associated with the UE devices 110 serviced by antenna array 210. Antenna management VM 410 may then send a request to real-time VM 440 to obtain settings for antenna array 210 based on the determined location of UE device 110 and the distribution of UE devices 110 serviced by antenna array 210. Real-time VM 440 may obtain the settings for antenna array 210 as described below with reference to FIG. 7.

Base station 130 may be instructed to apply the determined antenna array settings to the antenna array (block 635). For example, antenna array manager 430 may instruct base station 130 to apply the obtained antenna settings to antenna array 210 when communicating with UE device 110 at the particular location. In response, base station 130 may control antenna array 210 to generate an antenna beam that points in optimal beam direction 240, determined to be optimal with respect to MRT beam direction 220 and ZF beam direction 230.

A determination may be made as to whether the UE device 110 is moving (block 640). For example, UE device monitor 420 may determine whether the location of UE device 110 has changed within a particular time period. If it is determined that UE device 110 is not moving (block 640—NO), processing may proceed to block 660. If it is determined that UE device 110 is moving (block 640—YES), an expected future location of UE device 110 may be determined (block 645) and antenna array settings may be obtained from real-time VM 440 for the expected future location of UE device 110 (block 650).

For example, if UE device 110 is moving, UE device monitor 420 may determine the speed and direction of the movement of UE device 110 and may determine an expected location of UE device 110 based on the speed and direction of movement. In some implementations, UE device monitor 420 may obtain terrain information from 3D modeling VM 470 to identify a route along which UE device 110 is moving) (e.g., a particular road, etc.) and may determine the expected location of UE device 110 based on the identified route. Furthermore, in some implementations, beam forming DB 455 may include information identifying a series of settings for antenna array 210 to track UE device 110 when UE device 110 is moving along a particular route.

The signal quality may be monitored for UE device 110 (block 660). For example, UE device monitor 420 may monitor one or more signal quality parameters for UE device 110, such as, for example, an RSSI value, an RSRP value, a SNR value, a SINR value, a data throughput value, and/or another type of signal quality value.

A detection may be made that the signal quality is below a signal quality threshold (block 670) and 3D modeling may be initiated for the identified location and determined distribution of UE devices 110 in response (block 680). Thus, if the signal quality value is below a signal quality threshold, UE device monitor 420 may determine that a setting of antenna array 210 is not sufficiently accurate for the location associated with UE device 110 and may initiate 3D modeling, via 3D modeling VM interface 434, to determine a more accurate setting for antenna array 210. 3D modeling VM 470 may then perform the 3D modeling as described below with reference to FIG. 8.

Figure 7:
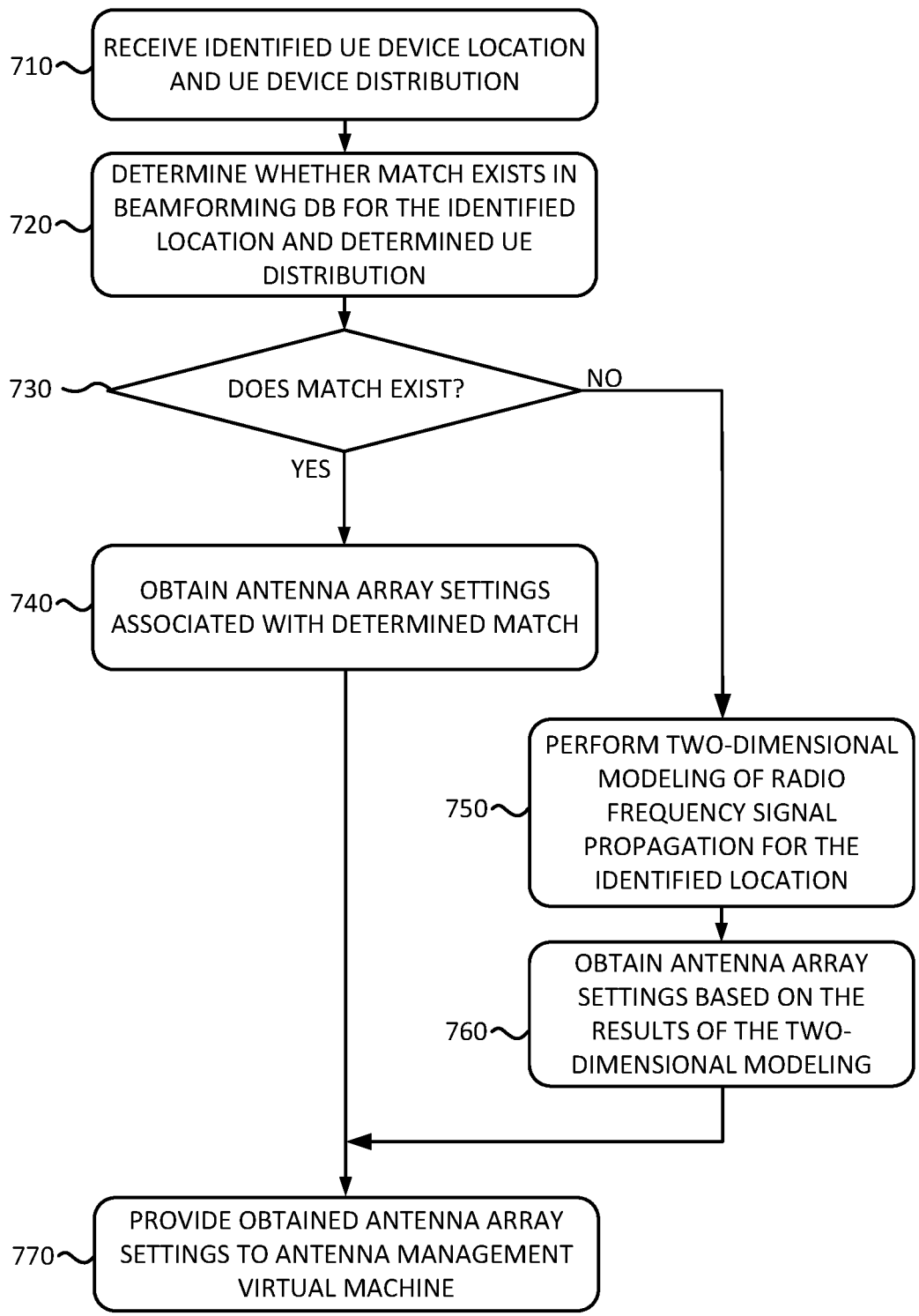
FIG. 7 is a flowchart of a process for determining an antenna array settings in real-time according to an implementation described herein.

FIG. 7 is a flowchart of a process for determining an antenna array settings in real-time according to an implementation described herein. In some implementations, the process of FIG. 7 may be performed by cloud center platform 154. In other implementations, some or all of the process of FIG. 7 may be performed by another device or a group of devices separate from the cloud center platform 154, such as base station 130.

The process of FIG. 7 may include receiving an identified UE device 110 location and a UE device 110 distribution (block 710) and determining whether a match exists in beam forming DB 455 for the identified location and determined UE device 110 distribution (block 720). For example, beam forming generator 450 may access beam forming DB 455 to determine whether a location entry 510 exists for the identified location. In some implementations, a match may be determined based only on the location of UE device 110. In other implementations, a match may be determined based on the location of UE device 110 and the distribution of UE devices 110 serviced by antenna array 210. In yet other implementations, a match may be determined based on the location of UE device, the distribution of UE devices 110, and the terrain conditions associated with the terrain of the area serviced by antenna array 210. The terrain conditions may be determined based on the time of day, the month of the year, the weather conditions (e.g., obtained from a weather information feed, etc.), the traffic conditions (e.g., obtained from a traffic information feed, a mapping application, etc.), a calendar associated with the terrain (e.g., a stadium calendar for a stadium in the terrain, etc.), and/or another type of information source for the terrain conditions.

If it is determined that a match exists (block 730—YES), antenna array settings associated with the determined match may be obtained (block 740). For example, beam forming generator 450 may retrieve the antenna array configuration settings from beam forming DB 455. If it is determined that a match does not exist (block 730—NO), 2D modeling of RF signal propagation for the identified location may be performed (block 750), antenna array settings based on the results of the 2D modeling may be obtained (block 760) and the obtained antenna array settings may be provided to antenna management VM 410 (block 770). For example, 2D modeling engine 460 may perform 2D modeling of RF signal propagation using a parabolic wave equation and a simple terrain model for the location of UE device 110 based on a range and altitude from antenna array 210 and may perform RF signal propagation modeling from the location of antenna array 210 to the location of UE device 110 using various beam directions to determine which beam direction results in the best signal quality received at the location of UE device 110. Since the 2D modeling may be independent of azimuth, the beam direction may be defined based on an altitude adjustment only and the computed antenna settings may be defined by a down tilt or up tilt adjustment to the antenna beam from antenna array 210 to UE device 110.

Figure 8:
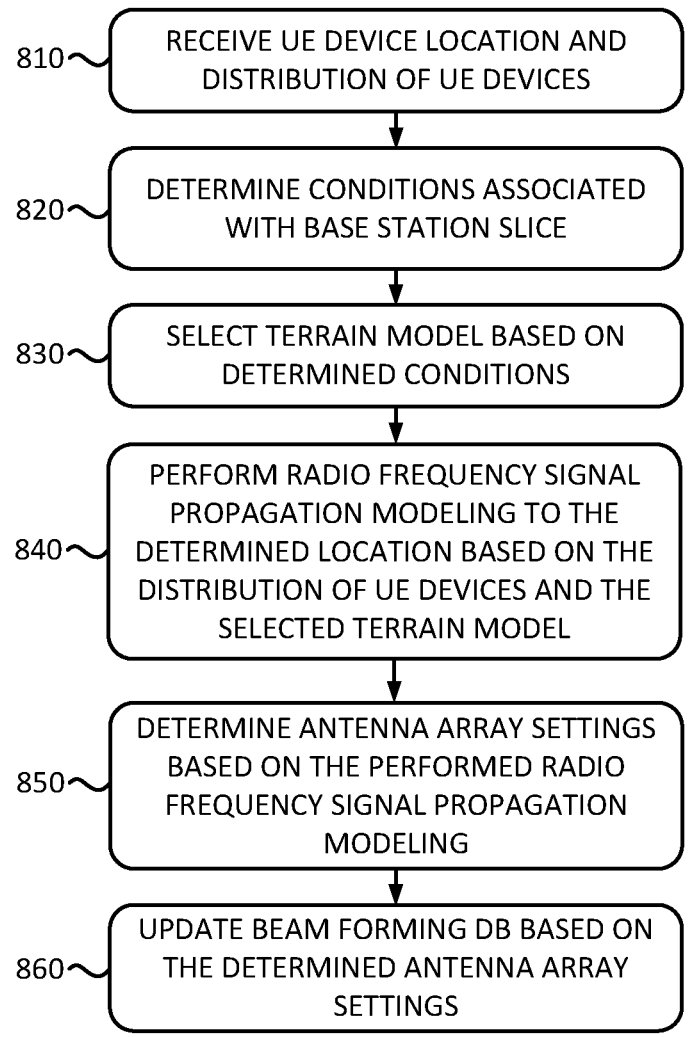
FIG. 8 is a flowchart of a process for three-dimensional modeling of radio frequency signal propagation according to an implementation described herein.

FIG. 8 is a flowchart of a process for three-dimensional modeling of radio frequency signal propagation according to an implementation described herein. In some implementations, the process of FIG. 8 may be performed by cloud center platform 154. In other implementations, some or all of the process of FIG. 8 may be performed by another device or a group of devices separate from the cloud center platform 154, such as base station 130.

The process of FIG. 8 may include receiving a location for UE device 110 and a distribution of UE devices serviced by a base station slice (block 810), determining conditions associated with the base station slice (block 820), selecting a terrain model based on the determined conditions (block 830), and performing RF signal propagation modeling for the determined location based on the distribution of UE devices 110 and the selected terrain model (block 840). For example, 3D modeling manager 480 may receive the location of UE device 110 from antenna management VM 410 and may receive information relating to the number of UE devices serviced by antenna array 210 and/or the priorities associated with the UE devices 110 serviced by antenna array 210. Furthermore, terrain model manager 490 may select a particular terrain model from terrain model DB 485 based on terrain conditions associated with the area serviced by antenna array 210, such as based on a month of the year, a time of the day, a weather condition, a traffic condition, a calendar event, and/or another type of condition associated with the terrain.

3D modeling manager 480 may then perform the 3D modeling of RF signal propagation using the selected terrain model. 3D modeling manager 480 may define a location of UE device 110 from antenna array 210 based on a range, altitude, and azimuth and may perform RF signal propagation modeling from the location of antenna array 210 to the location of UE device 110 through the terrain model using various beam directions to determine which beam direction generates the best signal quality at the location of UE device 110.

For example, for each beam direction, 3D modeling manager 480 may trace the RF signal through the terrain model to the location of UE device 110 and may calculate, at the location, one or more signal values, such as, for example, a signal reflection value, a signal refraction value, a signal interference value, a power loss value, a data throughput value, a signal to noise ratio value, an error rate value, and/or another type of value. As an example, 3D modeling manager 480 may select the beam direction associated with the highest received power at the location of UE device 110.

Antenna array settings may be determined based on the performed RF signal propagation modeling (block 850) and beam forming DB 455 may be updated based on the determined antenna array settings (block 860). For example, 3D modeling manager 480 may provide information relating to the determined optimal beam direction to beam forming generator 450 of real-time VM 440, and beam forming generator 450 may update beam forming DB 455 for the identified location, UE device 110 distribution, and/or terrain conditions with settings for antenna array 210 that generate an antenna beam in the determined optimal beam direction.

Figure 9:
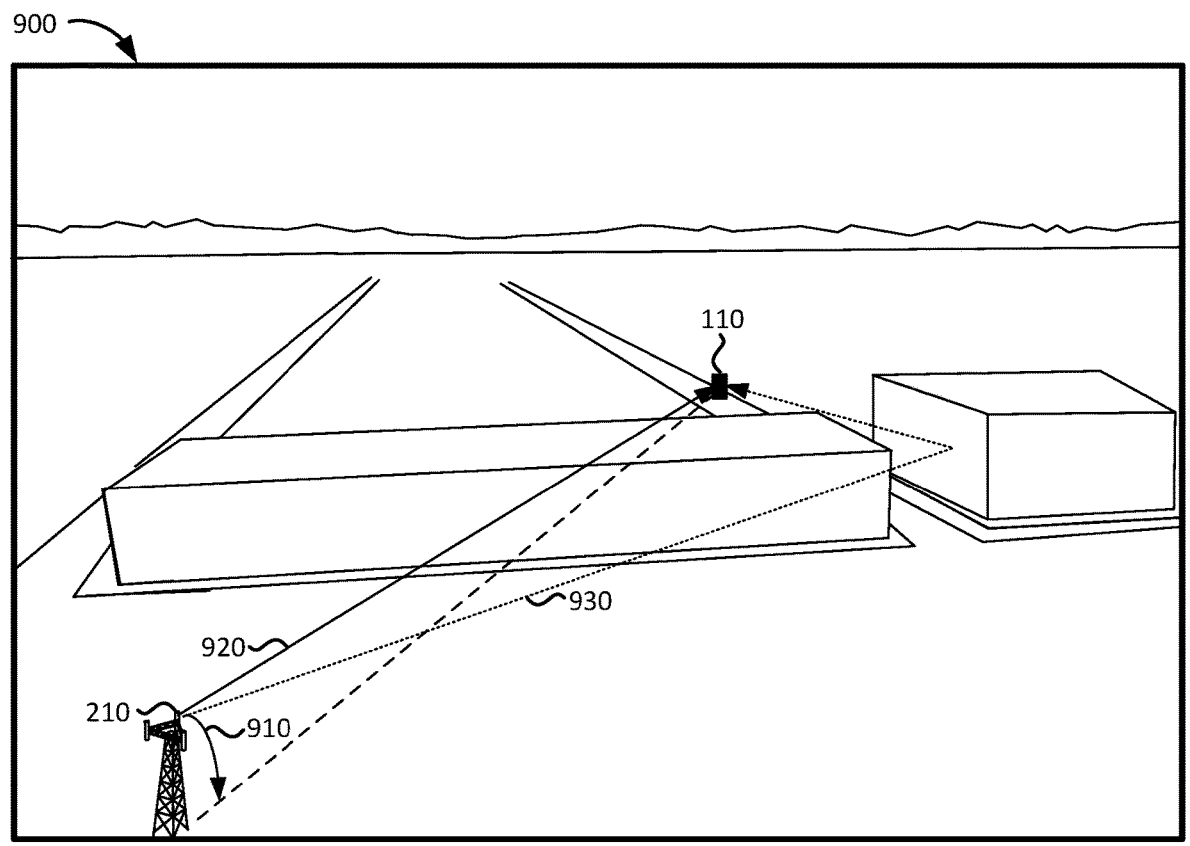
FIG. 9 is a diagram of an exemplary model used for two-dimensional modeling according to an implementation described herein.

FIG. 9 is a diagram of an model 900 used for 2D modeling according to an implementation described herein. As shown in FIG. 9, model 900 may include antenna array 210 at a particular location with respect to a simple terrain model that includes models of the surface of the earth, the atmospheric conditions, and simple terrain features, such as simplified building models. A location of UE device 110 may be identified in the terrain model using an altitude angle 910 and a range 920 and RF signal propagation may be modeled from antenna array 210 to UE device 110 by tracing RF signals 930 through the terrain model using different antenna beam directions. The signal quality received by UE device 110 may be determined for the different antenna beam directions and the best antenna beam direction may be selected based on the determined signal quality. The simple terrain and 2D modeling (e.g., using only two dimensional parameters, namely range and altitude) may enable the best antenna beam direction to be computed in substantially real-time.

Figure 10A:
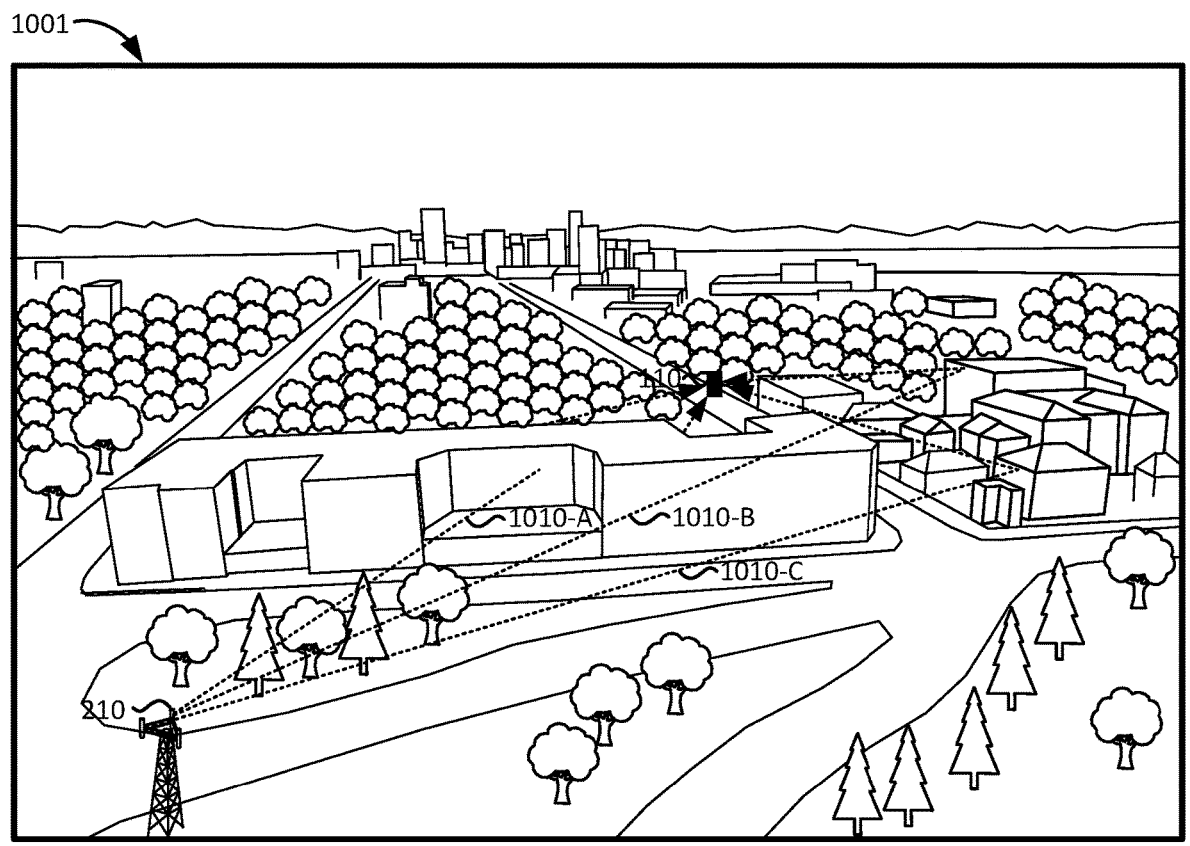
FIGS. 10A-10C are diagrams of exemplary three-dimensional models according to an implementation described herein.
Figure 10B:
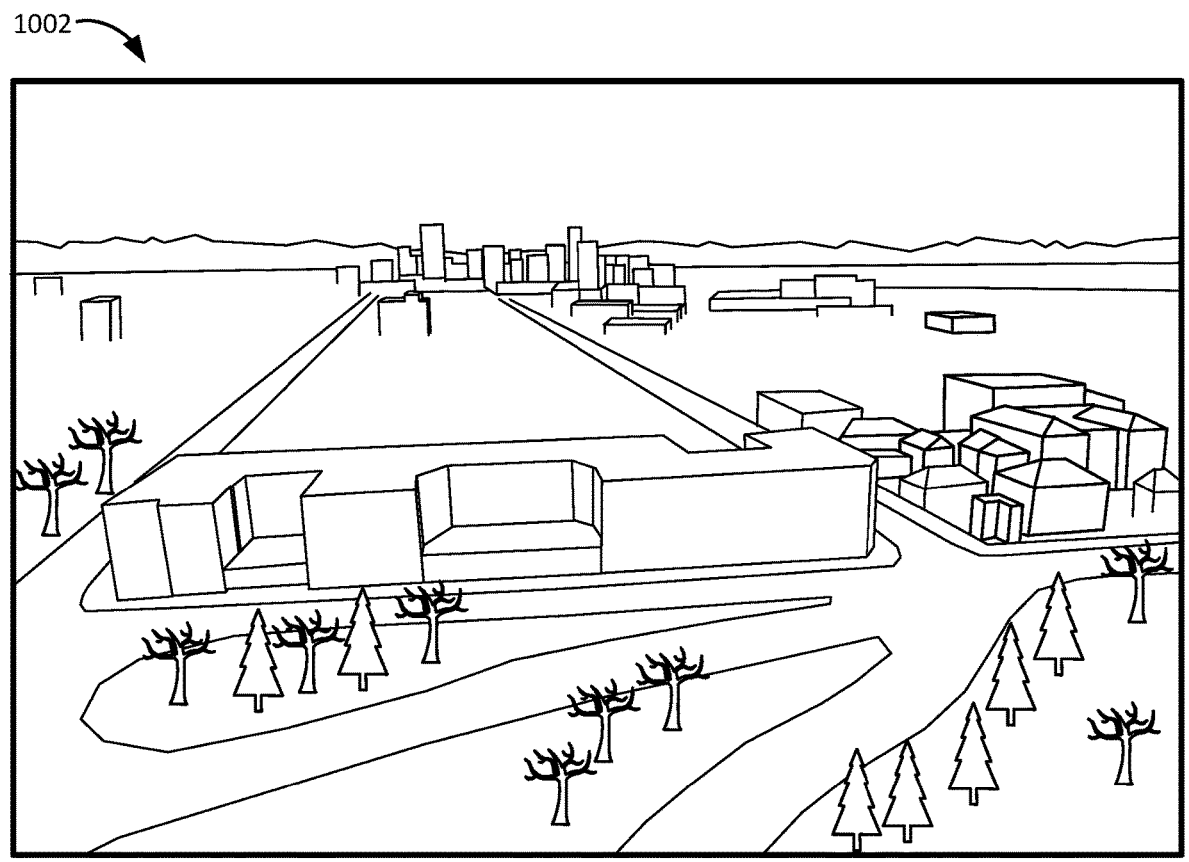
Figure 10C:
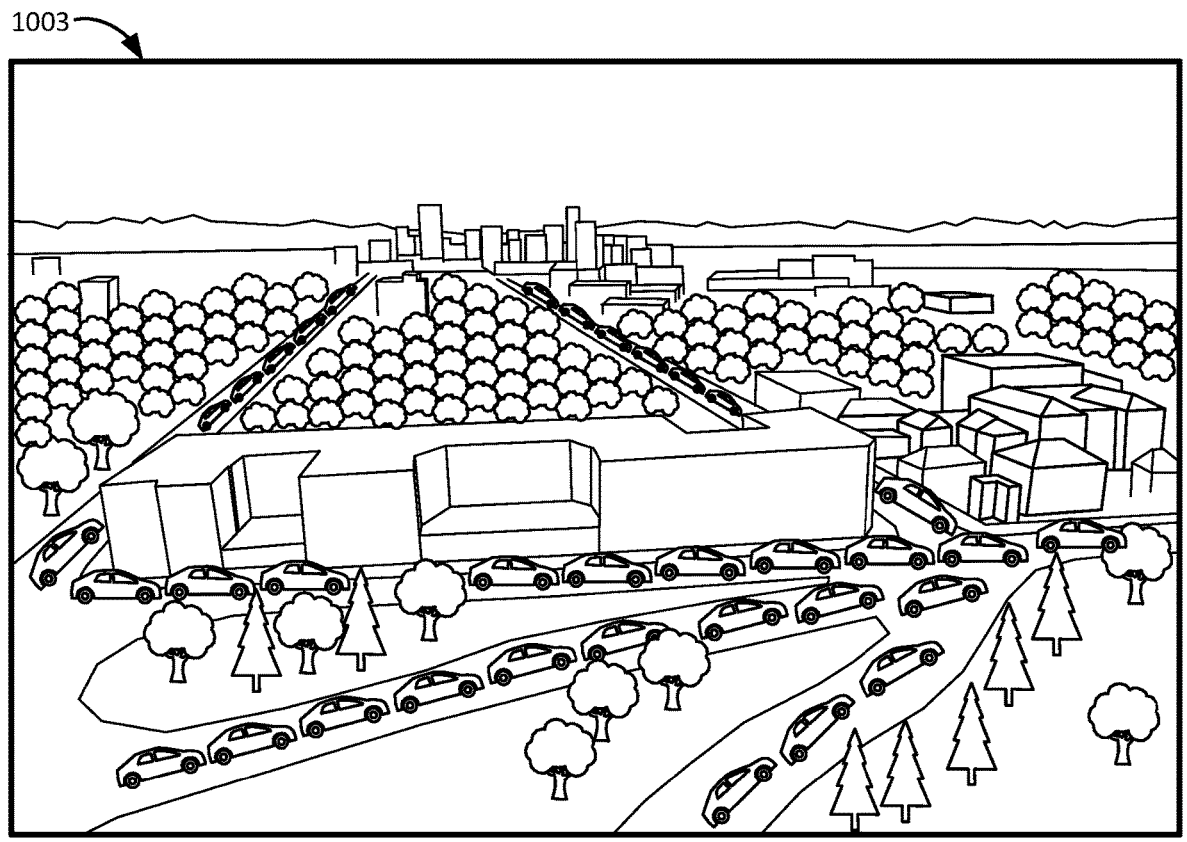

FIGS. 10A-10C are diagrams of exemplary 3D models according to an implementation described herein. FIG. 10A illustrates a first 3D model 1001, in which a terrain model is used with summer foliage. As shown in FIG. 10A, 3D model 1001 may include antenna array 210 in a particular location with respect to a terrain model that includes models of the surface of the earth, the atmospheric conditions, and features such as buildings, roads, and foliage. A location of UE device 110 may be identified in the terrain model using an altitude angle, an azimuth angle, and a range. RF signal propagation may be modeled from antenna array 210 to UE device 110 by tracing RF signals through the terrain model using different antenna beam directions. Three such signals are shown as 1010-A, 1010-B, and 1010-C in FIG. 10A. The signal quality received by UE device 110 may be determined for the different antenna beam directions and the best antenna beam direction may be selected based on the determined signal quality.

FIG. 10B illustrates a second 3D model 1002, in which a terrain model is used for winter conditions. As shown in FIG. 10B, the foliage shown in FIG. 10A may be removed and models of large trees near antenna array 210 may be replaced with models without foliage. Propagation of RF signals may differ in 3D model 1002 in comparison to 3D model 1001. FIG. 10C illustrates a third 3D modeling scenario 1003, in which a terrain model is used for a high traffic condition. As shown in FIG. 10C, vehicle models may be added to the roads to simulate a high traffic situation. Propagation of RF signals may differ in 3D model 1003 in comparison to 3D model 1001.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6, 7, and 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    identifying, by a computer device, a location for a user equipment (UE) device serviced by a base station sector associated with a base station;
    performing, by the computer device, modeling of radio frequency signal propagation for the identified location;
    determining, by the computer device, settings for an antenna array associated with the base station sector based on the performed modeling; and
    instructing, by the computer device, the base station sector to apply the determined settings to the antenna array.

2. The method of claim 1, wherein performing the modeling of radio frequency signal propagation for the identified location includes:
   performing two-dimensional modeling of radio frequency signal propagation for the identified location using a terrain model.
3. The method of claim 2, wherein performing the two-dimensional modeling of radio frequency signal propagation for the identified location using the terrain model includes:
   using a parabolic wave equation method to determine the radio frequency signal propagation.
4. The method of claim 1, further comprising:
   identifying another location for the UE device;
   determining that a match exists in a beam forming database for the identified other location;
   retrieving antenna settings for the identified other location, in response to determining that the match exists in the beam forming database for the identified other location; and
   instructing the base station associated with the base station sector to apply the retrieved antenna settings to the antenna array.
5. The method of claim 1, further comprising:
   determining that a signal quality associated with the UE device based on the determined settings is below a signal quality threshold;
   performing three-dimensional modeling of radio frequency signal propagation for the identified location using a terrain model, in response to determining that a signal quality associated with the UE device based on the determined settings is below a signal quality threshold; and
   determining updated settings for the antenna array associated with the base station sector based on the performed three-dimensional modeling.
6. The method of claim 5, wherein performing the three-dimensional modeling includes:
   tracing a radio frequency signal from a particular transmission location to a particular receiving location in the terrain model; and
   computing, at the particular receiving location and for the radio frequency signal, at least one signal value, wherein the at least one signal value includes:
      a signal reflection value,
      a signal refraction value,
      a signal interference value,
      a power loss value,
      a data throughput value,
      a signal to noise ratio value, or
      an error rate value.
7. The method of claim 5, further comprising:
   selecting the terrain model based on at least one of:
      a day of the year;
      a time of the day;
      a weather condition associated with the identified location;
      a traffic condition associated with the identified location; or
      a calendar event associated with the identified location.
8. The method of claim 5, further comprising:
   determining that an updated signal quality associated with the UE device based on the updated settings is below the signal quality threshold; and
   generating an alert, in response to determining that the updated signal quality associated with the UE device based on the updated settings is below the signal quality threshold.
9. The method of claim 5, wherein performing the three-dimensional modeling of radio frequency signal propagation for the identified location using a terrain model includes:
   determining a beam forming channel direction for the UE device as a weighted average of a maximum ratio transmission (MRT) channel direction and a Zero Forcing (ZF) channel direction.
10. The method of claim 9, wherein the ZF channel direction is based on priorities assigned to other UE devices serviced by the base station sector.
11. The method of claim 1, further comprising:
    determining that the UE device is moving;
    determining an expected location of the UE device at a particular time in the future, in response to determining that the UE device is moving; and
    performing two-dimensional modeling of radio frequency propagation for the expected location using a terrain model.
12. The method of claim 11, further comprising:
    determining that the expected location of the UE device is associated with another antenna array; and
    providing information associated with the expected location of the UE device to an antenna management controller associated with the other antenna array.
13. A device comprising:
    a memory configured to store instructions; and
    a processor configured to execute the instructions to:
       identify a location for a user equipment (UE) device serviced by a base station sector associated with a base station;
       perform modeling of radio frequency signal propagation for the identified location using a terrain model;
       determine settings for an antenna array associated with the base station sector based on the performed modeling; and
       instruct the base station to apply the determined settings to the antenna array.
14. The device of claim 13, wherein, when performing the modeling of radio frequency signal propagation for the identified location using the terrain model, the processor is further configured to:
    perform two-dimensional modeling of radio frequency signal propagation for the identified location using a terrain model using a parabolic wave equation.
15. The device of claim 13, wherein the processor is further configured to execute the instructions to:
    identify another location for the UE device;
    determine that a match exists in a beam forming database for the identified other location;
    retrieve antenna settings for the identified other location, in response to determining that the match exists in the beam forming database for the identified other location; and
    instruct the base station to apply the retrieved antenna settings to the antenna array.
16. The device of claim 13, wherein the processor is further configured to execute the instructions to:
    determine that a signal quality associated with the UE device based on the determined settings is below a signal quality threshold;
    perform three-dimensional modeling of radio frequency signal propagation for the identified location using a terrain model, in response to determining that a signal quality associated with the UE device based on the determined settings is below a signal quality threshold; and determine updated settings for the antenna array associated with the base station sector based on the performed three-dimensional modeling.

17. The device of claim 16, wherein, when performing the three-dimensional modeling, the processor is further configured to:
trace a radio frequency signal from a particular transmission location to a particular receiving location in the terrain model; and
compute, at the particular receiving location and for the radio frequency signal, at least one signal value, wherein the at least one signal value includes:
a signal reflection value,
a signal refraction value,
a signal interference value,
a power loss value,
a data throughput value,
a signal to noise ratio value, or
an error rate value.

18. The device of claim 16, wherein the processor is further configured to:
select the terrain model based on at least one of:
a month of the year;
a time of the day;
a weather condition associated with the identified location;
a traffic condition associated with the identified location; or
a calendar event associated with the identified location.

19. The device of claim 13, wherein the processor is further configured to:
determine that the UE device is moving;
determine an expected location of the UE device at a particular time in the future, in response to determining that the UE device is moving; and
perform two-dimensional modeling of radio frequency propagation for the expected location using a terrain model.

20. A non-transitory computer-readable memory device storing instructions executable by a process, the non-transitory computer-readable memory device comprising:
one or more instructions to identify a location for a user equipment (UE) device serviced by a base station sector associated with a base station;
one or more instructions to perform modeling of radio frequency signal propagation for the identified location;
one or more instructions to determine settings for an antenna array associated with the base station sector based on the performed modeling; and
one or more instructions to instruct the base station to apply the determined settings to the antenna array.

* * * * *